United States Patent [19]

Chang et al.

[11] Patent Number: 4,715,504
[45] Date of Patent: Dec. 29, 1987

[54] ORIENTED PLASTIC CONTAINER

[75] Inventors: Long F. Chang, Sylvania; Scott W. Steele, Toledo, both of Ohio

[73] Assignee: Owen-Illinois Plastic Products Inc., Toledo, Ohio

[21] Appl. No.: 912,188

[22] Filed: Sep. 25, 1986

Related U.S. Application Data

[63] Continuation of Ser. No. 783,061, Oct. 2, 1985, which is a continuation of Ser. No. 595,118, Mar. 30, 1985.

[51] Int. Cl.⁴ ............................................. B65D 23/00
[52] U.S. Cl. ................................... 215/1 C; 425/525; 264/513
[58] Field of Search ............... 215/1 R, 1 C; 264/247, 264/255, 510, 513, 523, 539; 425/523, 525; 428/35

[56] References Cited

U.S. PATENT DOCUMENTS

| 1,858,356 | 5/1932 | Brown | 215/1 R |
|---|---|---|---|
| 3,026,576 | 3/1962 | Henderson | 264/513 |
| 3,115,682 | 12/1963 | Soubier et al. | 264/539 |
| 4,140,236 | 2/1979 | Uhlig et al. | 428/35 |
| 4,307,137 | 12/1981 | Ota et al. | 264/513 |
| 4,330,579 | 5/1982 | Ota et al. | 215/1 C |
| 4,406,854 | 9/1983 | Yoshino | 215/1 C |
| 4,414,731 | 11/1983 | Riemer | 264/513 |
| 4,507,258 | 3/1985 | Aoki | 264/513 |

FOREIGN PATENT DOCUMENTS

| 49-36947 | 10/1974 | Japan | 264/513 |
|---|---|---|---|
| 50-89056 | 7/1980 | Japan | 425/525 |
| 2078194 | 7/1980 | United Kingdom | 425/525 |

Primary Examiner—George E. Lowrance
Assistant Examiner—David T. Fidei
Attorney, Agent, or Firm—H. G. Bruss

[57] ABSTRACT

A preform for making oriented plastic containers wherein the preform is first formed and thereafter reheated to an orientation temperature range and blown to final container shape comprising an open ended finish part made of a first plastic material, and an elongated main hollow body of orientable strain-hardenable thermoplastic material molded and bonded in situ on the open ended finish. The hollow body includes a main container body forming portion and a bottom container forming portion closing the open end of the main body forming portion. The main body has a portion projecting axially within the open end of the finish terminating in a spaced relationship to the open free end of the finish and interlocked with the finish part.

13 Claims, 9 Drawing Figures

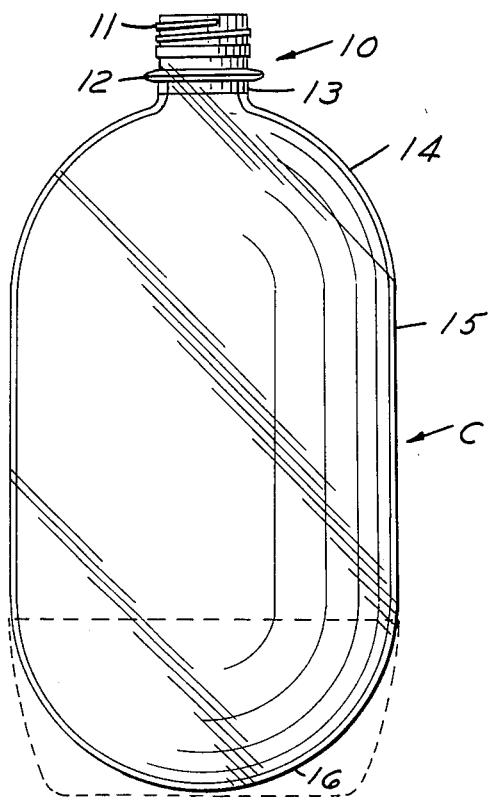
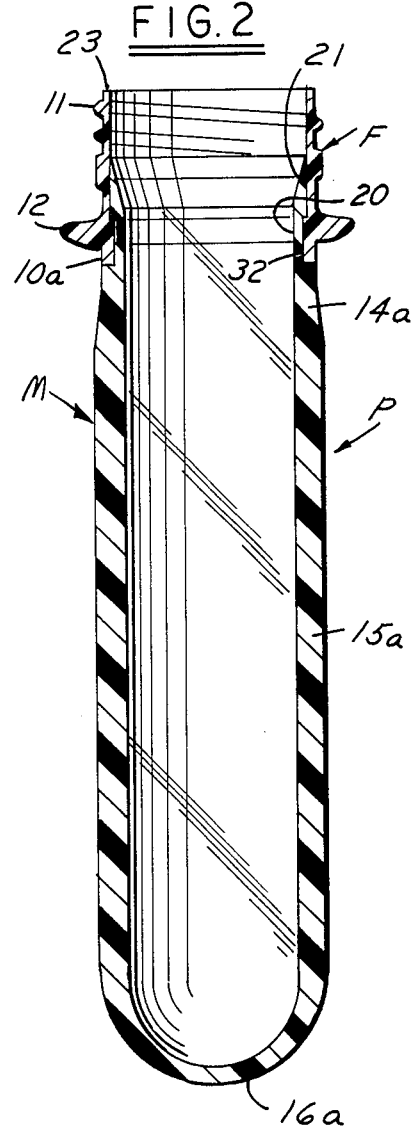
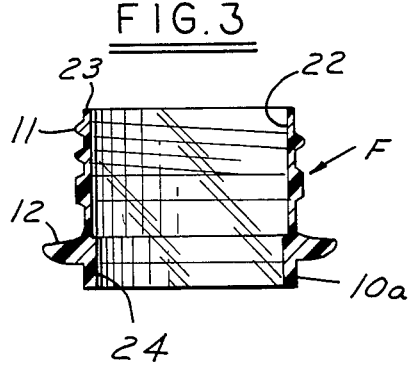

ORIENTED PLASTIC CONTAINER

This application is a continuation of application Ser. No. 783,061, filed Oct. 2, 1985, which is, in turn, a continuation of Ser. No. 595,118, filed Mar. 30, 1985.

This invention relates to blow molded hollow plastic containers and particularly to oriented hollow plastic containers.

BACKGROUND AND SUMMARY OF THE INVENTION

In the making of hollow plastic containers it is common to first form a preform or parison by injection molding and thereafter blow the preform within the confines of a mold to the shape of the container. When an orientable plastic is used the preform can be cooled and stored until needed and then reheated to an orientation temperature and blown to the final configuration in the mold.

Alternatively, the hot injection molded preform can be cooled to orientation temperature and immediately moved to a blow molding station and blown to induce orientation.

In one common type of preform or parison, which is injection molded, the preform includes a finish which has an external thread and defines the open end of the container that receives a closure, a radially outwardly extending annular ledge below the finish, a neck below the ledge, a shoulder, a generally cylindrical body and a closed bottom end.

When the resultant container is utilized to hold liquids that are filled at elevated temperatures or where the container and its contents are to be pasteurized, there may be a tendency for the finish portion to become distorted resulting in a poor seal with the closure that is applied to the finish of the container.

It has heretofore been suggested that the preform be made of two materials, the finish portion being made of polycarbonate and the remainder of the preform being made of the plastic material having the desired properties for the remainder of the container such as polyethylene terephthalate (PET). The preform is constructed so that the main PET body portion extends within the polycarbonate finish and over the free end of the finish. This has been achieved by injection molding the finish in a partible neck mold, moving the neck mold into registry with a mold which has a core and a cavity for forming the remainder of the main body and injection molding the plastic such as PET so that the finish and main body are bonded to one another.

Such an arrangement is helpful in defining more stable threads on the finish but is still subject to the deficiency of having a portion of the PET material covering the free end of the finish.

Another problem with such a method is that the neck mold which forms the finish must necessarily be used in forming the main body onto the finish.

Accordingly, among the objectives of the present invention are to provide a preform that is made of two plastic materials which are compatible with one another; wherein the plastic utilized for the finish has greater dimensional stability and is utilized to a minimum due to potentially higher cost; wherein less expensive material may be used in the main body of the preform; wherein the amount of more expensive finish material is minimized; wherein the resultant container has greater dimensional stability at the juncture of the finish and the main body portion and at the upper rim of the finish where filling machinery and the closure contact the finish portion.

In accordance with the invention, the preform for making plastic containers wherein the preform is first formed and thereafter blow molded immediately or cooled for storage, reheated to an orientation temperature range and blown to final container shape comprises an open ended finish part made of a first plastic material having threads on the outer surface of the open end and an elongated main hollow body of orientable strain-hardenable thermoplastic material molded and bonded in situ on said open ended finish. The hollow body includes a main body container forming portion and a bottom container forming portion closing the open end of the main body forming portion. The main body has a portion projecting axially within the open end of the finish at the end opposite the threaded end and terminating in spaced relationship to the open free thread bearing end of the finish and interlocked with the finish.

DESCRIPTION OF THE DRAWINGS

FIG. 1 is an elevational view of a container made from a preform embodying the invention.

FIG. 2 is a sectional view of a preform embodying the invention.

FIG. 3 is a sectional view of the finish portion of the preform.

DESCRIPTION

Figure 4:
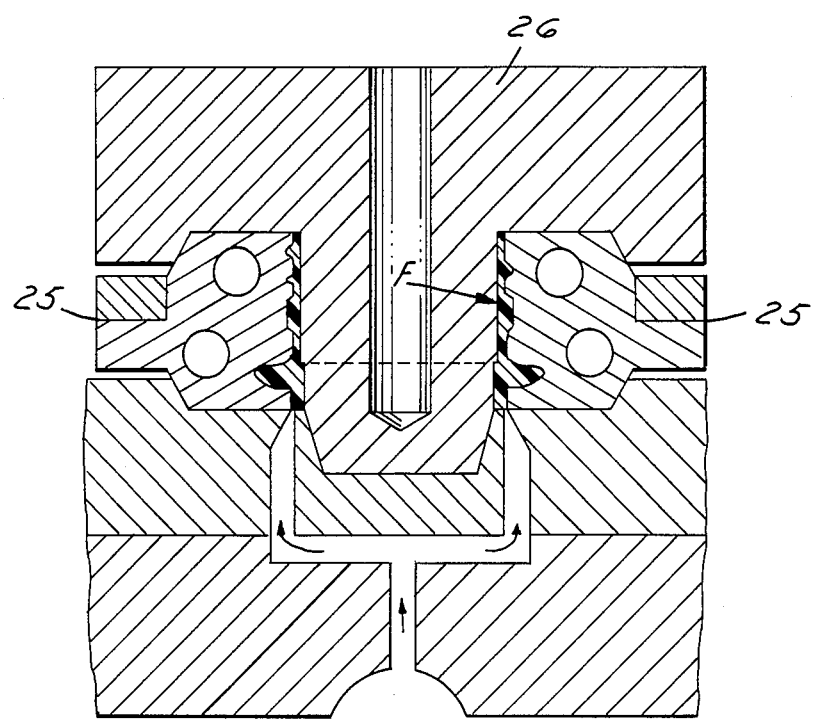
FIG. 4 is a sectional view of a mold for forming the finish portion of the preform.

Referring to FIG. 1, the invention relates to making containers of plastic material and preferably oriented plastic material wherein the container C comprises a finish 10 that has an opening therethrough and threads 11 thereon. An annular supporting ledge 12 is provided below the finish and a neck 13 joins the finish to a shoulder portion 14, a main body portion 15 and a bottom portion 16 which is hemispherical or hemielliptical.

In the preferred form, the shoulder 14 and the main body 15 and bottom 16 of the container are made of oriented material, such as polyethylene terephthalate. Alternatively, the container may be of a small size, made by injection blow molding and be substantially unoriented.

Referring to FIGS. 2 and 3, the preform or parison P of the present invention for making the containers C, which is injection molded as presently described, comprises a first part or finish part F that is injection molded and includes the threads 11, an annular ledge 12 and a portion 10a of the neck. The inner surface 22 of the finish part F is formed with an annular radially inwardly extending rib 24. The finish part F is made of a plastic material that has properties different from the remainder of the preform and preferably properties of greater dimensional stability at elevated temperatures. A preferred material that can be used is polycarbonate.

The body includes a part M of the preform comprising a shoulder forming portion 14a, a cylindrical main body forming portion 15a and a bottom forming portion 16a. A portion 20 of the preform extends upwardly within the finish part F and tapers as at 21 toward the inner surface 22 and terminates in spaced relation to a free end portion 23 of the finish part F.

Referring to FIG. 4, the finish part F is made in a partible mold 25 comprising partible mold sections and defining the threads 11 on the outer surface and a mandrel 26 defining the inner surface 22. After the first part F is made it can be stored and utilized as needed to make the completed preform.

Figure 5:
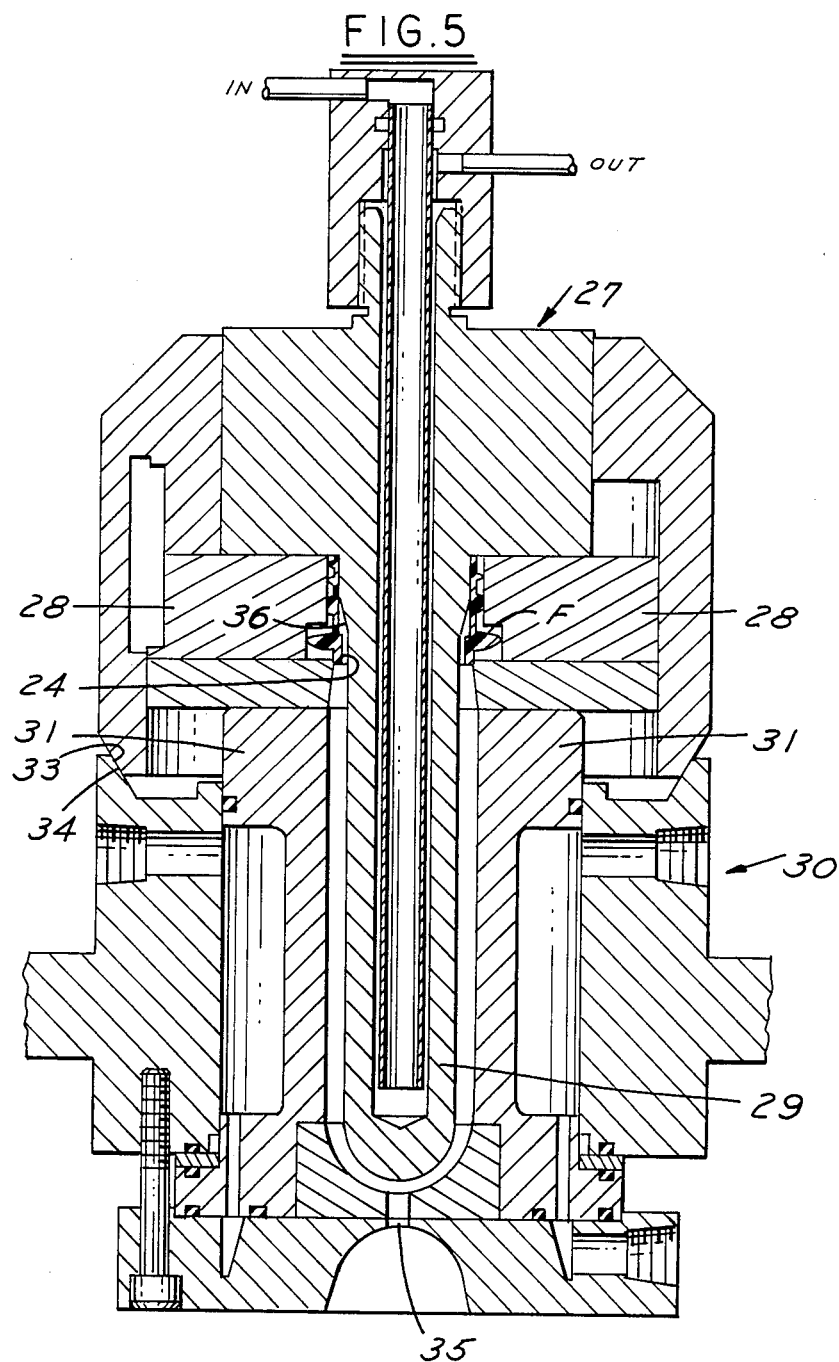
FIG. 5 is a sectional view of a mold for forming the main body portion to the preform.

Referring to FIG. 5, the apparatus for making the completed preform P comprises an upper partible neck mold 27 comprising mold sections 28 that receive the previously formed finish insert or part F, a core 29 extending axially through the opening in insert F and into a partible main body mold 30 comprising sections 31. Neck mold 27 is closed about the finish part F and the next mold 27 and main body mold 30 are moved axially toward one another and locked by interengaging surfaces 33, 34. Plastic is introduced through a bottom opening 35 and flows upwardly to fill the cavity of the main body mold 30. The configuration of the main body mold 30 is such that a space is provided to permit the plastic of the main body to flow outwardly about the rectangular rib 24 formed on the internal surface 22 of the finish insert F so that a groove 32 in the main body part M is molded about the rib 24 to interlock the finish part F axially to the main body part. The core 29 further has an inclined surface 36 to define the portion 21 of the main body part that extends upwardly within the finish insert 10 and is spaced from the free end. Cooling is provided in accordance with conventional practice.

When the parison or preform P is reheated and blown within the mold, the shoulder portion 14a, main body portion 15a and bottom portion 16a of the preform P are blown outwardly to the confines of the blow mold defining a plastic container. The finish 10 and neck 13 are not blown and remain dimensionally as injected.

Figure 6:
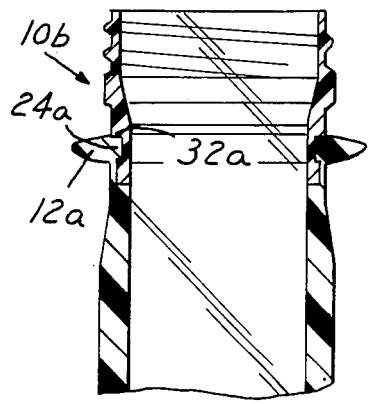
FIG. 6 is a sectional view of a modified form of the preform.

In the modified form of preform shown in FIG. 6 an annular groove 32a is formed in the finish part 10b and a complementary annular rib 24a is molded into the groove 32a as a part of the main body portion.

Figure 7:
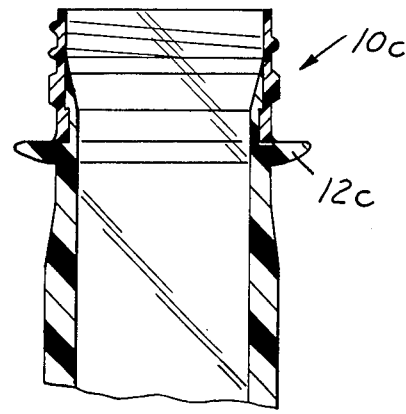
FIG. 7 is a sectional view of a further modified form of the preform.

In the form of preform shown in FIG. 7 the finish part 10c is formed without a ledge and a supporting ledge 12c is made a part of the main body portion, that is, it is made of the same plastic as the main body portion.

Figure 8:
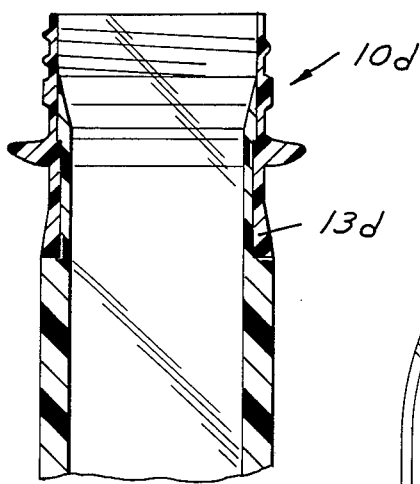
FIG. 8 is a sectional view of a further modified form of the preform.
Figure 9:
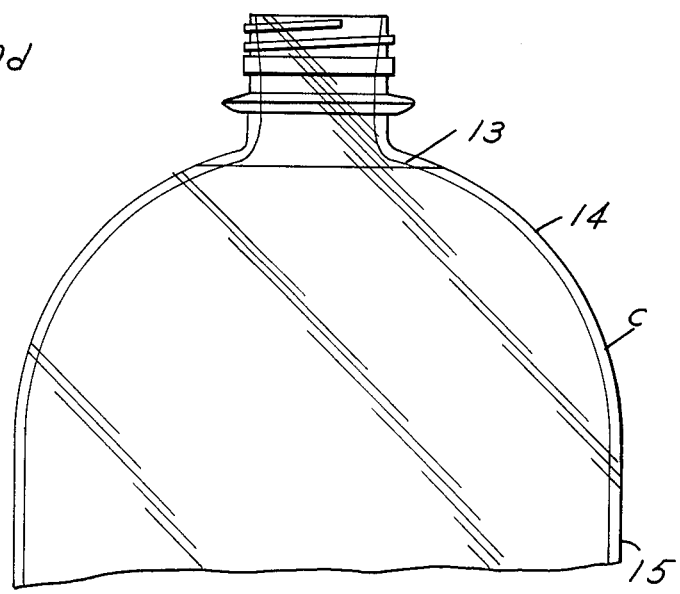
FIG. 9 is a fragmentary view of a container made by utilizing the preforms of the invention.

In the form shown in FIG. 8, the preform has a finish part 10d that includes an integral portion 13d extending axially downwardly to define the neck 13 of the container thereby providing the same material, having greater dimensional stability, in the neck 12 of the container as shown in FIG. 1.

In each of the forms of the invention the finish insert and the main body portion of the preform are bonded directly to one another preferably without any adhesive, being made of compatible materials, but have different properties as may be desired. In addition, the free edge of the finish is positioned for sealing with the closure.

Inasmuch as the tooling or mold for forming the finish is the most costly but the cycle time for finish is less than that required for molding the remainder of the preform, the formation of the preform in two injection steps permits the more efficient use of the finish mold than a single finish mold 27 can supply finish parts for a plurality of preform main body molds 30.

We claim:

1. A preform for making oriented plastic containers having a dimensionally stable finish comprising:
   an injection molded finish part having an open upper end and an open lower end and made of a first plastic material,
   said finish part including an axially extending inner surface and an axially extending outer surface, said outer surface including a thread portion extending axially and defining an exterior thread on the neck of the final container,
   an elongated main hollow body of orientable strain-hardenable thermoplastic material injection molded and bonded in situ on said previously molded open ended finish part,
   the material of said finish part having substantially greater thermal stability than the material of said hollow body,
   said hollow body including a main body container forming portion and a closed bottom container forming portion closing the open end of the main body forming portion,
   said hollow body having an axially extending body portion of said body engaging the open lower end of the finish part and extending within the inner surface of said finish part, the body portion having a free end terminating within and in axially spaced relationship to the open upper end of the finish part such that the inner surface of said finish part is exposed to the atmosphere and said exterior thread portion is exposed to the atmosphere, and
   such that when the preform is blown at orientation temperatures, the hollow body forms the hollow body of a container with said inner surface of said finish part adjacent said open end of the finish part being exposed to the atmosphere and the outer surface of said open upper end of said finish part and the outer surface of said threaded portion of said finish part being exposed to the atmosphere in order that said exposed surfaces of greater thermal stability are subjected to the hot containers during filling of the container or when the contents are to be pasteurized.

2. The preform set forth in claim 1 including interengaging means between said finish part and said body comprising a groove in one of said finish part and said main body portion and a complementary rib in the other of said finish part and said body.

3. The preform set forth in claim 2 wherein said groove and said rib are rectangular in cross section.

4. The preform set forth in claim 1 wherein said finish part includes an integral annular supporting ledge extending radially outwardly made of the same material as said finish.

5. The preform set forth in claim 1 wherein said main body includes an integral annular ledge extending radially outwardly and made of the same material as said main body.

6. The preform set forth in claim 1 wherein said finish part includes a portion extending axially and defining a portion of the exterior of the neck of the final container.

7. The preform set forth in claim 1 wherein said finish part is made of polycarbonate material and said hollow body is made of polyethylene terphthalate.

8. The preform set forth in claim 1 wherein said body includes an integral annular ledge and an internal annular rib, said finish part including a groove into which said annular rib extends mechanically locking said finish part and body.

9. An oriented plastic container comprising:
an injection molded finish part having an open end and an open lower end and made of a first plastic material,
said finish part including an axially extending inner surface and an axially extending outer surface, said outer surface including a thread portion extending axially and defining an exterior thread on the neck of the final container,
an elongated main hollow body of orientable strain-hardenable thermoplastic material made from a preform injection molded and bonded in situ on said previously molded open ended finish part,
the material of said finish part having substantially greater thermal stability than the material of said hollow body,
said hollow body including an enlarged main body container portion and a bottom container portion closing the open end of the main body portion,
said finish part having an axially extending body portion of said body engaging the open lower end of the finish part and extending within the inner surface of said finish part, the body portion having a free end terminating within and in axially spaced relationship to the open end of the finish part with said inner surface of said finish part adjacent said open end of the finish part being exposed to the atmosphere and the outer surface of said open upper end of said finish part and the outer surface of said threaded portion of said finish part being exposed to the atmosphere in order that said exposed surfaces of greater thermal stability are subjected to the hot contents during filling of the container or when the contents are to be pasteurized.

10. The plastic container set forth in claim 9 wherein said finish part includes an integral annular supporting ledge extending radially outwardly made of the same material as said finish.

11. The plastic container set forth in claim 9 wherein said main body includes an integral annular ledge extending radially outwardly and made of the same material as said main body.

12. The plastic container set forth in claim 9 wherein said main body includes an integral annular ledge and an internal annular rib, said finish part including a groove into which said annular rib extends mechanically locking said finish part and body.

13. The plastic container set forth in claim 12 wherein said finish part is made of polycarbonate material and said hollow body is made of polyethylene terephthalate.

* * * * *